United States Patent

[11] 3,575,655

[72] Inventor Hans George Dehmelt
Seattle, Wash.
[21] Appl. No. 407,422
[22] Filed Oct. 29, 1964
[45] Patented Apr. 20, 1971
[73] Assignee Varian Associates
Palo Alto, Calif.
Continuation-in-part of application Ser. No. 350,887, Mar. 10, 1964, now abandoned, Continuation of application Ser. No. 649,191, Mar. 28, 1957, now abandoned.

[54] APPARATUS FOR OPTICALLY MONITORING THE GYROMAGNETIC RESONANCE OF QUANTUM SYSTEMS
9 Claims, 6 Drawing Figs.

[52] U.S. Cl. ..................................................... 324/0.5,
331/3, 331/94.5
[51] Int. Cl. ....................................................... G01n 33/08
[50] Field of Search ........................................... 324/0.5,
(Inquired); 331/94.5, 94, 3

[56] References Cited
UNITED STATES PATENTS
2,884,524 4/1959 Dicke .......................... 324/0.5
3,071,721 1/1963 Dehmelt ...................... 324/0.5
3,150,313 9/1964 Dehmelt ...................... 324/0.5
3,165,705 1/1965 Dicke ........................... 324/0.5
3,246,254 4/1966 Bell .............................. 324/0.5
3,267,360 8/1966 Dehmelt ...................... 324/0.5

Primary Examiner—Rudolph V. Rolinec
Assistant Examiner—Michael J. Lynch
Attorney—Stanley Z. Cole ABSTRACT: There is disclosed improved magnetometer and frequency stabilizing apparatus which utilizes the principles of optical alignment and monitoring of quantum systems. Optical irradiation of said quantum systems in a unidirectional magnetic field effects alignment which alignment may then be monitored by detecting the nonabsorbed pumping radiation. Realignment of the quantum system by application of a radio frequency magnetic field results in changes in the detected nonabsorbed radiation which changes may be used to control either the frequency of the radio frequency magnetic field or the intensity of said unidirectional magnetic field to maintain said quantum systems at resonance. Quantum systems of the type disclosed include the alkali atoms, such as potassium, rubidium, sodium and cesium which are quantum systems exhibiting nonvanishing total angular momentum.

INVENTOR.
HANS G. DEHMELT
BY
ATTORNEY

INVENTOR.
HANS G. DEHMELT 3,575,655

APPARATUS FOR OPTICALLY MONITORING THE GYROMAGNETIC RESONANCE OF QUANTUM SYSTEMS

This application is a continuation-in-part of copending application Ser. No. 350,887, filed Mar. 10, 1964, now abandoned, which is a continuation of abandoned application Ser. No. 649,191, filed Mar. 28, 1957.

This invention is related to the inventions disclosed and claimed in U.S. Pat. No. 3,071,721, entitled "Optical Absorption Monitoring of Oriented or Aligned Quantum Systems", and patent application Ser. No. 649,190, entitled "Optical Absorption Monitoring of Aligned Alkali Atoms", filed Mar. 28, 1957, abandoned in favor of continuation application Ser. No. 313,186, U.S. Pat. No. 3,267,360 each application filed in behalf of the subject applicant and assigned to the same assignee. In particular, the latter patent application discloses a novel method and apparatus for producing alignment of one optical electron quantum systems (the optical energy level structures of which are attributable to a single unpaired electron in an outermost $S$ or $P$ shell), such as the atoms of the alkali group of elements, with long relaxation times in an external magnetic field by optical pumping techniques and the subsequent optical detection of the light utilized for the optical pumping whereby the alignment of the atoms is monitored. The present invention has for its purpose the production and optical detection of paramagnetic resonance of quantum systems with extremely narrow line widths and very high signal-to-noise ratios, such as the described alkali atoms including potassium, rubidium and cesium which are quantum systems exhibiting nonvanishing total angular momentum.

In patent application Ser. No. 313,186, sodium atoms are employed, by way of example, to describe the invention and this procedure will be followed in this application for continuity. As set forth in this patent application, sodium atoms in vapor form are mixed in an absorption vessel with a buffer gas of argon which greatly increases the relaxation time of the sodium atoms. The vessel is located in a unidirectional magnetic field $H_0$ which may, for example, be the earth's magnetic field. A sodium light source producing $\lambda 5896$ radiation is provided, this radiation being focused in a beam parallel to the unidirectional magnetic field through a circular polarizer and through the absorption vessel, the beam, after passing through the vessel, being focused on a radiation-responsive apparatus such as a photocell. This circularly polarized light produces a substantial alignment of the sodium atoms in the unidirectional magnetic field by the process of optical pumping, that is, an overpopulation of certain of the nonabsorbing energy sublevels of the ground state of the sodium atoms. This relative change in the population of the nonabsorbing and absorbing sublevels results in a related change in the energy absorbed from the optical radiation. Thus, the intensity of the light impinging on the photocell is a function of the alignment of the sodium atoms.

In one embodiment of the present invention, a radio frequency magnetic field is applied to the aligned alkali atoms normal to the magnetic field $H_0$ at the Larmor frequency of the atoms in the external magnetic field $H_0$ to produce paramagnetic resonance of the atoms, that is, transitions between Zeeman sublevels according to the quantum selection rule $\Delta M = \pm 1$. At resonance, and assuming the nonabsorbing sublevels were overpopulated relative to the absorbing sublevels, the absorbing sublevels are populated at the expense of the nonabsorbing sublevels, and a substantial increase in the optical absorption from the optical beam by the alkali atoms takes place. The decreased radiation passing from the atom sample is detected by the optical radiation detection apparatus. Thus, the paramagnetic resonance effect may be conveniently detected by measuring the radiation absorbed by the atoms from the optical radiation utilized to initially optically pump the atoms.

In another embodiment of the present invention, a radio frequency magnetic field is applied to the aligned alkali atoms parallel to the magnetic field $H_0$, thereby affording field independent hyperfine transitions. Thus, it is possible to stabilize a radio frequency generator to a very high degree by means of a closed feedback loop, which includes the RF generator and which is coupled to the output circuit of the optical radiation detection apparatus.

It is therefore an object of the present invention to provide a novel method and apparatus for producing and optically detecting paramagnetic resonance of quantum systems exhibiting nonvanishing total angular momentum, such as alkali elements, for example.

One feature of the present invention is the provision of a novel system for applying a radio frequency magnetic field to aligned quantum systems including, for example, alkali atoms to produce gyromagnetic resonance of the atoms and for detecting said resonance by observing the variation of the energy absorbed by the atoms from an optical radiation source due to the realignment of the atoms during resonance, said system providing resonance signals with extremely narrow line widths and extremely high signal-to-noise ratios.

Another feature of the present invention is the provision of a novel system of the above-featured type in which the optical radiation utilized to monitor the realignment of the atoms is also utilized to initially align the atoms by optical pumping techniques.

Still another feature of the present invention is the provision of a novel gyromagnetic resonance device for utilization in measuring unknown magnetic fields.

Still another feature of the present invention is the provision of a novel system wherein the oscillator of a signal generator is stabilized to a high degree resonance frequency of said gyromagnetic resonance device.

These and other features and advantages of the present invention will become apparent from a perusal of the following specification taken in connection with the accompanying drawings wherein.

Similar numerals refer to similar elements throughout the drawing.

Figure 1:
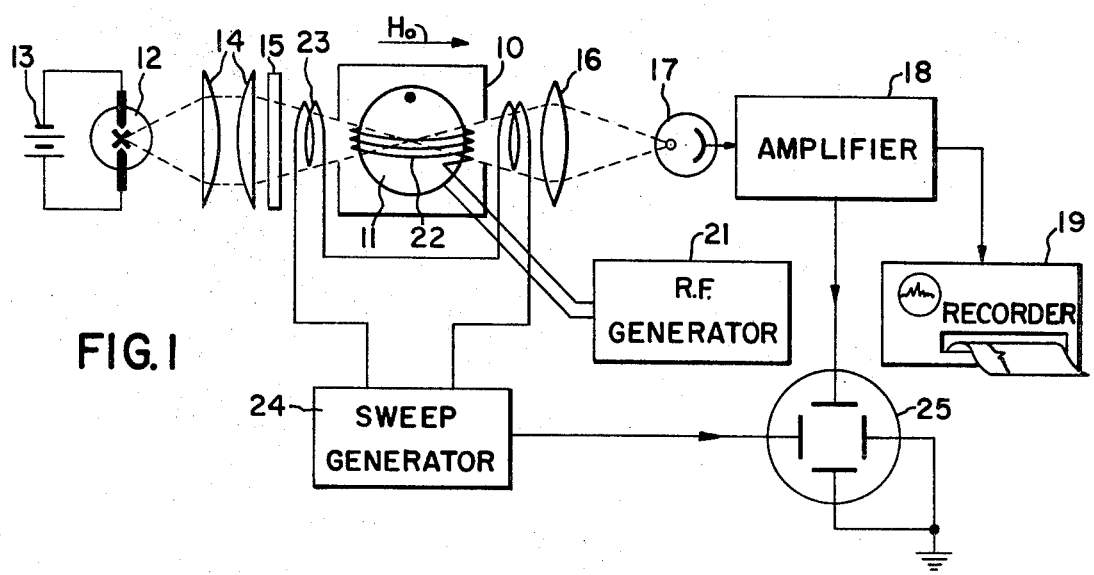
FIG. 1 is a block diagram of a novel system for detecting paramagnetic resonance of aligned sodium atoms by optical radiation monitoring techniques.

Referring now to FIG. 1, there is shown one embodiment of the present invention which utilizes an evacuated spherical glass absorption vessel 11 of about 1 liter containing a small amount of metallic sodium in equilibrium with its vapor and containing argon at a pressure of about 30 mm Hg. As pointed out in the copending application Ser. No. 313,186, this pressure is sufficiently high that the sublevel relaxation time of atoms in the optically excited states is shorter than the time it takes these atoms to emit radiation and return to the ground state whereby the population distribution over the sublevels of the excited state is essentially randomized before emission occurs. The absorption vessel is heated by an oven 10 to such a temperature (130°—150° C.) that about 50 percent absorption occurs. The argon acts as a buffer gas for the sodium and it results in the realization of a relaxation time of about 0.21 seconds for the ground state sublevel alignment of the sodium atoms.

Figure 2:
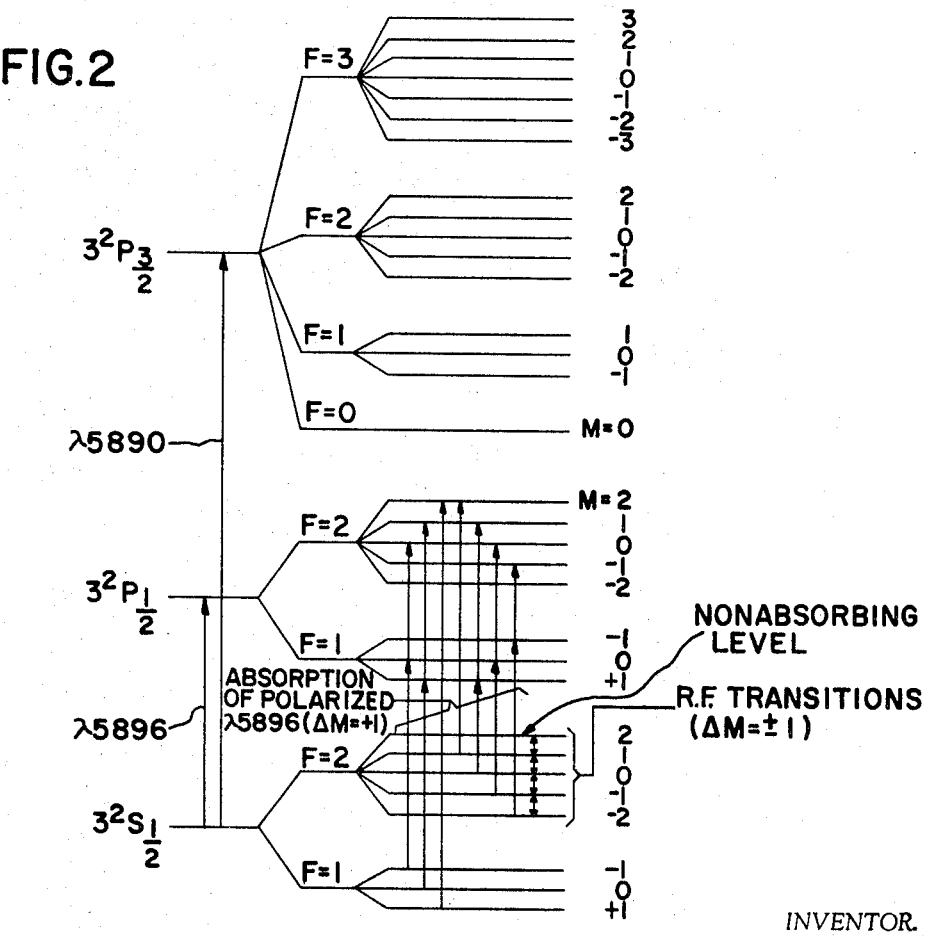
FIG. 2 is a schematic diagram depicting the energy levels of the sodium atoms of particular interest and the transitions therebetween.

The ground or lowest energy state of the sodium atoms is the $3^2S_{1/2}$ level which, due to total angular momentum considerations, is split into two hyperfine states $F=1$, and $F=2$ (see FIG. 2). The vessel is located in a magnetic field $H_0$ which may for example, be the earth's magnetic field, and the $F=1$ hyperfine state is split into three Zeeman sublevels $M=0, \pm 1$ while the $F=2$ hyperfine state is split into five Zeeman sublevels $M=0, \pm 1, \pm 2$, these Zeeman sublevels being spaced-apart in the atomic spectrum by the Larmor frequency of the sodium atoms in the magnetic field $H_0$; in an earth's magnetic field of one-half gauss this Larmor frequency is approximately 350 Kc/sec.

A source of optical radiation of λ5896 Angstrom units is provided comprising a commercial sodium arc lamp 12 operated from a battery 13, the lamp being mounted in a Dewar (not shown). The radiation from this lamp is focused by a condenser lens 14 through a circular light polarizing sheet 15 onto the absorption vessel 11. In this particular embodiment of the invention, the optical radiation is parallel to the magnetic field $H_0$ and the circular polarization is clockwise looking from the source 12 to the vessel 11 or right polarized. The optical radiation from the lamp 12, after it has passed through the vessel 11, is focused by lens 16 upon a vacuum photocell 17 whose output is amplified by a broad band amplifier 18 and displayed on an oscilloscope or graphic recorder 19.

In accordance with known quantum theory selection rules, the circularly polarized optical radiation induces $\Delta M=+1$ transitions of the sodium atoms between the ground state $3^2S_{1/2}$ and the higher energy state $3^2P_{1/2}$ which are separated λ5896 in the spectrum. $3^2P_{1/2}$ state (see FIG. 2) is split into two hyperfine states $F=1, 2$, which are in turn split into three and five Zeeman sublevels, respectively. Due to the selection rule $\Delta M=+1$ considering the positive Z-axis pointing in the direction of the light beam, all of the sodium atoms in the Zeeman sublevels in the $3^2S_{1/2}$ state except those in the $M=+2$ sublevel of the $F=2$ hyperfine level absorb energy from the λ5896 radiation and are raised to the $3^2P_{1/2}$ level. The atoms in this higher level may return to the ground state sublevels by giving up the necessary quanta of energy by collisions or the like and quantum theory rules permit the atoms to return to the different sublevels. As a result, the nonabsorbing $M=+2$ sublevel gains atoms at the expense of other sublevels until a saturation polarization is attained.

The amount of radiation absorbed by the sodium atoms may be determined by means of the photoelectric cell 17, the DC output of the photocell 17 being a direct function of the λ5896 radiation impinging thereon. Thus, increased radiation absorption in the absorption vessel 11 will result in a decrease in the DC output from the photocell 17 which may be viewed as an increased or decreased signal, by selection of suitable electrical amplification means, on the recorder-oscilloscope device 19.

Actually, the process of optical pumping for alignment of the sodium atoms is more complex than the simple illustration given above as explained in the above cited patent application Ser. No. 313,186. There is also present in the sodium light source a λ5890 radiation in addition to the λ5896 (these two radiations are so-called D lines of sodium) and this λ5890 radiation is of the proper frequency to raise the sodium atoms from the ground state to the $3^2P_{3/2}$ energy state which is composed of four hyperfine states $F=0, 1, 2$ and 3, which in turn comprise 16 Zeeman sublevels. This affects the number of sodium atoms which populate the sublevels of the ground state but a preponderance of one radiation or the other insures an alignment. Commercial sodium lamps are readily available in which a substantial differential exists between the intensity of the two D lines. Also, one or the other of these D lines may be filtered out if desired.

Other alignment processes will immediately occur to those skilled in this art such as, for example, by a circular polarization of the transmitted sodium light opposite, that is, counterclockwise, to that in the above illustration, the quantum theory selection rule $\Delta M=-1$ governs and the $M=-2$ magnetic sublevel of the hyperfine $F=2$ level of the ground state is the nonabsorbing level and becomes overpopulated relative to the remaining magnetic sublevels.

Figure 3:
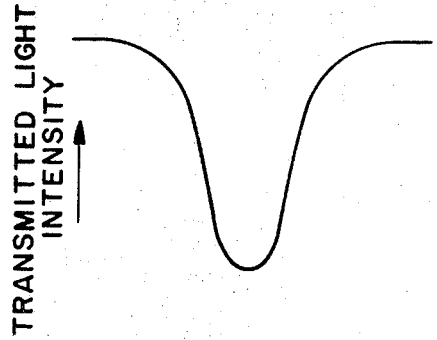
FIG. 3 is an oscilloscope trace of $\lambda 5896$ absorption by $3^2S_{1/2}$ sodium atoms versus field $H_0$ and shows the increase in absorption by paramagnetic resonance realignment induced by a radio frequency field with the optical pumping light parallel to $H_0$ and circularly polarized clockwise.

Any effect which tends to change the relative populations of the magnetic sublevels and produce a change in the number of atoms in the absorbing sublevels will produce a change in the intensity of the transmitted light. A substantial increase of the λ5896 radiation absorption by the sodium atoms may be accomplished by producing a paramagnetic resonance realignment of the sodium atoms in the energy state $3^2S_{1/2}$ so as to cause transitions between the Zeeman sublevels. Thus, by applying, by means of a suitable signal generator 21 and a radio frequency coil 22 adjacent the absorption vessel 11, a radio frequency magnetic field $H_1$ perpendicular to the direction of the magnetic field $H_0$, and of the Larmor frequency (350 kc.) of the sodium atoms in the earth's magnetic field $H_0$ of approximately one-half gauss a resonance of the sodium atoms occurs wherein $\Delta M=\pm 1$ transitions are induced between the magnetic sublevels. The absorbing Zeeman sublevels will now be populated at the expense of the nonabsorbing Zeeman sublevel $M=+2$ during the resonance transitions. This increased population of the absorbing sublevels results in a substantial weakening of the λ5896 light detected by the photocell. By modulation techniques common to those skilled in the art of gyromagnetic resonance, such as, for example, by modulating the magnetic field $H_0$ with an audio frequency sweep magnetic field by use of suitable modulation coils 23 and associated sweep generator 24, the point of maximum paramagnetic resonance may be periodically swept through and viewed on an oscilloscope 25, the horizontal sweep plates of which are coupled to the audio sweep generator 24. The decrease in transmitted radiation occurring during resonance is depicted in the oscilloscope trace in FIG. 3. It is apparent that modulation of the frequency of the radio frequency field $H_1$ may be utilized to sweep through resonance rather than modulation of the magnetic field $H_0$. Thus, the paramagnetic resonance may be detected by the expedient of monitoring the alignment of the sodium atoms by the observation of the absorption of polarized optical radiation utilized to optically pump the atoms initially.

Figure 4:
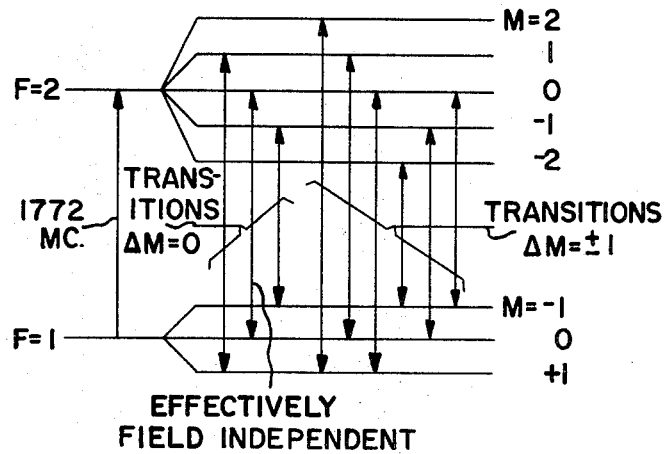
FIG. 4 is a schematic drawing depicting the radio frequency transitions induced between the hyperfine levels of the ground state of the alkali atoms.

A similar situation is encountered when either zero field $\Delta F=\pm 1$; $\Delta M=0, \pm 1$ microwave transitions are induced between the hyperfine $F$ groups by a magnetic radio frequency field of the appropriate direction and frequency, 1772 mc. for Na—or $I$ and $J$ are decoupled in strong magnetic fields. The case of $\Delta F=\pm 1$; $\Delta M=0, \pm 1$ microwave transitions induced between the hyperfine $F$ groups of the sodium atoms is depicted in FIG. 4. In accordance with quantum mechanics, the transitions between the $F=2$; $M=0$ level and the $F=1$; $M=0$ fields. With the gyromagnetic resonance frequency magnetic field of 1772 mc. parallel to the unidirectional magnetic field, the $\Delta M=0$ transitions are induced, and when perpendicular the $\Delta M=\pm 1$ transitions occur.

It should be understood that a microwave cavity coupled to the generator 21 through a phase modulator may be used at suitable frequencies in lieu of the RF coil 22 in those cases where hyperfine transitions are to be observed.

The sodium vapor resonance line has a thermal relaxation time $T_1$ of about 0.2 seconds and an extremely narrow line width corresponding to a width in magnetic field units of about $10^{16}$ gauss. The reasons for this extremely narrow line width are believed to be:

a. Rare collisions of the relatively small number of sodium atoms present in the absorption vessel with each other.

b. Prevention of frequent wall collisions by the high-pressure buffer.

The number of sodium atoms in the absorption vessel at these vapor pressures of about $10^{17}$ mm. Hg. is so small that it is impossible to detect the resonance by the usual resonance techniques of radio frequency coils or cavities closely coupled to the sample. The optical detection of this resonance provides a detection method with an extremely high signal-to-noise ratio. In this method, the absorption of a quantum or photon of radio frequency energy in transitions of the sodium atoms between Zeeman sublevels is manifested by the absorption from the transmitted light beam of a photon of light energy. In the earth's magnetic field the radio frequency photon frequency is about $10^6$ cycles per second whereas the optical photon frequency is about $10^{15}$ cycles per second; thus there is an amplification of about $10^9$ of energy absorbed in the resonance process. This serves to explain why enormous signal-to-noise ratios can be obtained in this experiment even though the process of monitoring the transmission of a light beam by a light responsive means such as a photocell is a relatively inefficient process–about 10 quanta/electron for the best layers–compared to those which are used for monitoring radio frequency energy. The energy gained through the magneto-optic amplification is so enormous that it greatly overrides all losses in the system.

In accordance with known quantum theory, the spectral frequency of the energy quanta $hY$ separating the Zeeman magnetic sublevels, termed the Larmor frequency, is a direct function of the strength of the magnetic field $H_0$ producing the level splitting. Therefore, for a given atom, if the strength of the magnetic field $H_0$ is known, the Larmor frequency may be determined and vice versa. In the sodium atom example given, the Larmor frequency was 350 kc. in the one-half gauss magnetic field. The utilization of the present invention as a magnetometer device of high sensitivity and rapid response is immediately obvious.

Figure 5:
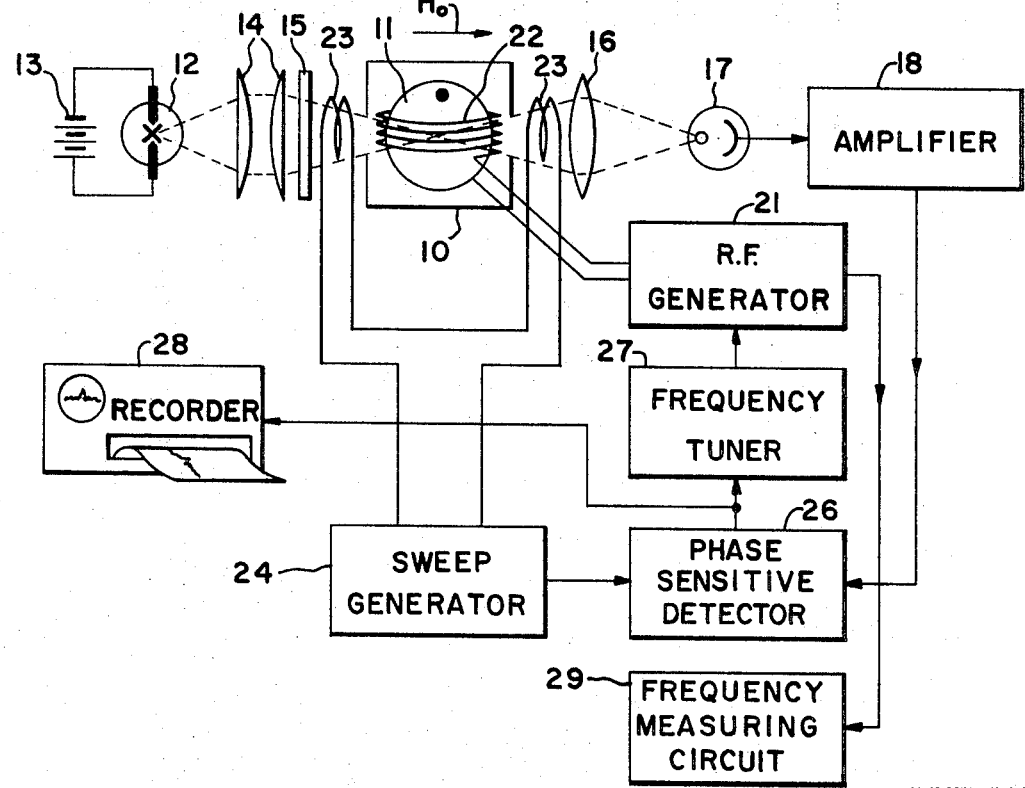
FIG. 5 is a block diagram of a novel alkali element system.

One practical magnetometer device is shown in FIG. 5. The above-described paramagnetic resonance apparatus including the optical radiation detecting apparatus is placed in an unknown magnetic field $H_0$ and the frequency of the applied radio frequency magnetic field from the generator 21 is adjusted until the minimum optical radiation transmission is detected by the photocell 17, indicating maximum paramagnetic resonance which occurs at the Larmor frequency. From this Larmor frequency, the magnetic field strength may be easily determined by a frequency measuring equipment 29 coupled to the generator 21. The output from the amplifier 18 is transmitted to a phase sensitive detector 26 to which a reference signal is also transmitted from the audio sweep circuit 24. The output of the phase sensitive detector 26 is a DC voltage, the sign of which is dependent on whether the resonance is shifted off maximum resonance on the high or low side and the magnitude of which is dependent on the magnitude of the shift. This DC error signal is transmitted to a frequency tuning circuit 27 which operates to automatically tune the generator 21 to the optimum resonance value. A suitable strip chart recorder 28 may be utilized for recording the frequency or error signal in terms of magnetic field strength. When utilizing the field independent hyperfine transitions discussed above with respect to FIG. 4, the system of FIG. 5 does not lend itself for use as a magnetometer device in weak magnetic fields due to the field independence; however, it does serve to stabilize to a very high degree the oscillator of RF generator 21, the frequency of which is the hyperfine transition frequency (1772 mc. for sodium). Because of the field independence, it is preferable to modulate the radio frequency of generator 21 to sweep through resonance rather than modulate the field $H_0$. The modifications required for such a system, which serves as a frequency stabilization system are shown in FIG. 6.

Figure 6:
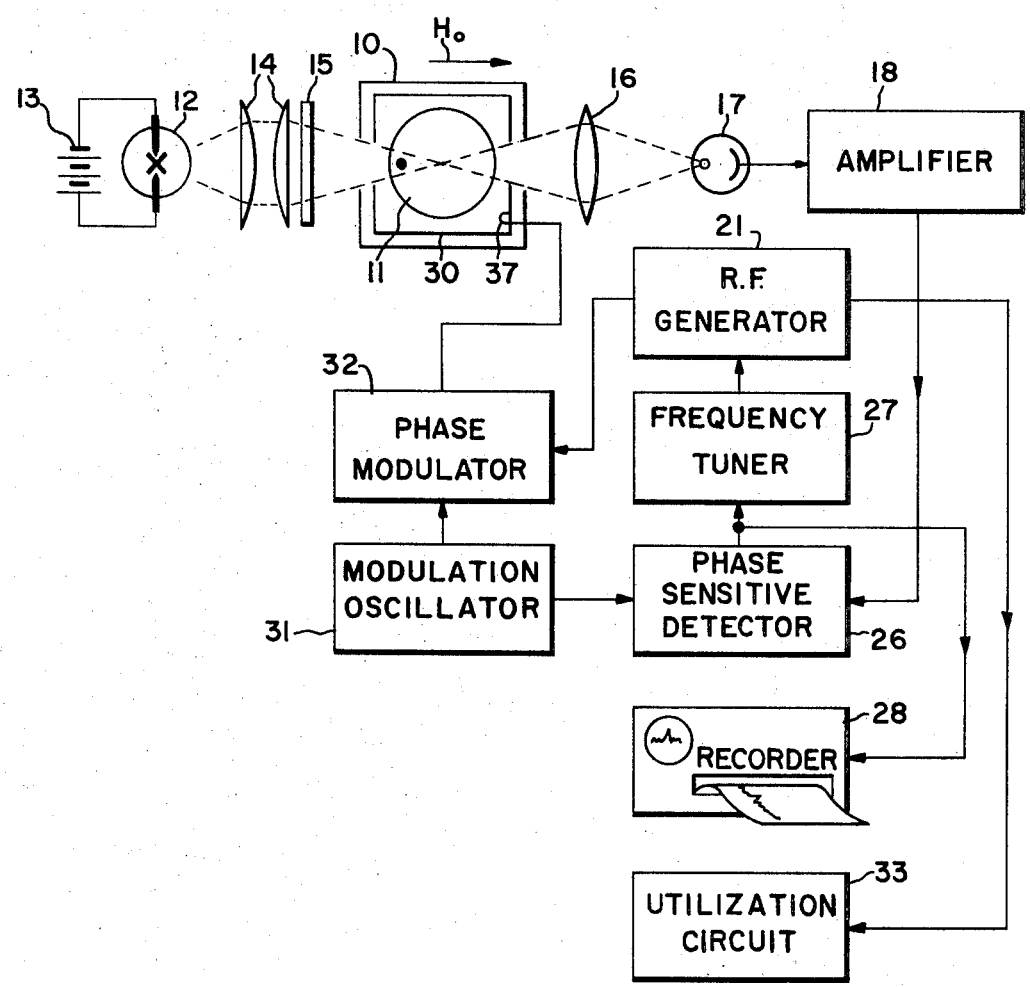
FIG. 6 is a modification of FIG. 5 wherein a field independent $\Delta M = 0$ hyperfine transition is used in a frequency stabilization system.

In FIG. 6, the radio frequency signal generator 21 generates an alternating signal that is frequency modulated by means of a modulation oscillator 31 and phase modulator 32, in a well-known manner. The modulated signal is supplied through a coupler 37, to a cavity resonator 30 which encompasses the absorption vessel 11. The cavity resonator 30 may be a hollow cylinder, by way of example, with end portions having slots therein to allow the optical pumping light from the lamp 12 to impinge on the absorption cell 11, and the nonabsorbed light to pass to the photocell 17. The microwave coupling loop is coupled from the modulator 32 to an end of the cylindrical cavity to provide a microwave RF field $H_1$ substantially parallel to the polarizing field $H_0$, so that the transitions which are effectively independent of magnetic field may be induced between hyperfine states. It should be understood that the cavity need not be cylindrical, but may be rectangular or of some other configuration. Also, a radio frequency coil may be employed at suitable frequencies instead of the cavity to provide the proper field.

In this embodiment of the invention, the signal detected by the photocell 17, including the modulation frequency and harmonics, is passed through the amplifier 18 to the phase detector 26. At the same time, a reference signal derived from the modulation oscillator 31 is applied to the phase detector 26. If the frequency of the RF generator is not coincident with the resonance frequency detected by the photocell 17, an error signal is produced by the detector 26. The error signal is directed to the frequency tuner 27 which serves to maintain the signal produced by the RF generator 21 at a precise frequency. The RF generator 21 is therefore disposed in a closed feedback loop, and the oscillator of generator 21 is stabilized to a predetermined frequency in response to the signal detected by the photocell 17. In this manner, a highly stable frequency signal may be obtained from the RF generator for utilization in a circuit 33, for example.

It is also possible to investigate various alkali atoms spectroscopically by this paramagnetic resonance equipment having precisely determined magnetic fields $H_0$, radio frequencies and optical transmission frequencies.

The above example of sodium atoms was utilized to describe this invention. It will be immediately recognized by those skilled in this art that this invention is not limited to sodium atoms but applies, for example, to the other alkali atoms such as potassium, rubudium and cesium which are quantum systems exhibiting nonvanishing total angular momentum.

When using sodium, relatively high temperatures are needed both at the light source and in the absorption cell (230° C. and 140° C., respectively). Also, the close spacing of 6 Angstrom units of the sodium $D$ lines, requires fine filtering out of one of the lines. In the case of the alkali metals potassium, rubidium and cesium, the radiation lines which excite the $P_{1/2}$ and $P_{3/2}$ energy levels are relatively far apart and may be separated by interference filters. Potassium is quite satisfactory for many types of applications of this invention. The operating characteristics of the potassium absorption cell appear to be optimum at about 60° C., an ideal ambient temperature. The two spectral lines of interest for potassium are at 7,644 and 7,698 Angstrom units making the filtering problem somewhat simpler than in the case of sodium. Rubidium has the advantage that it has a higher hyperfine constant resulting in smaller splitting in the earth's magnetic field, and the two spectral lines of interest are several hundred Angstrom units apart making filtering extremely simple. The operating temperature for the rubidium absorption cell is near room temperature. Cesium has no common isotopes of spins 3/2, all having greater spins, resulting in a lower Larmor frequency in a given magnetic field. Lithium has a very low vapor pressure, requiring high operating temperatures, and also the two spectral lines are very close together (less than 1 Angstrom unit). With regard to transitions between the hyperfine $F$ groups of these alkali atoms, the hyperfine separation is 462 mc. for potassium ($K^{39}$), 3036 mc. for $Rb^{85}$, 6835 mc. for $Rb^{87}$ and 9193 mc. for Cs.

I claim:

1. Apparatus for monitoring the ground state sublevel alignment of magnetic moments of alkali atoms in vapor form in a unidirectional magnetic field comprising: means for optically irradiating said atoms with a circularly polarized radiation having a substantial propagation direction component parallel to said magnetic field, said optical radiation having a spectral frequency supplying quanta of energy to produce transitions between energy levels to thereby align said atoms in the magnetic field; optical radiation responsive means for detecting said optical radiation after it has irradiated and passed through said atoms; and means for applying a radio frequency magnetic field to said atoms at the gyromagnetic resonance frequency in said magnetic field to thereby produce gyromagnetic resonance of said magnetic moments, said gyromagnetic resonance being evidenced as a change in the detected optical radiation, wherein said alkali atoms have a thermal relaxation time in the ground state, and said alkali vapor is mixed with a buffer gas to increase the relaxation time of the alkali atoms.

2. Apparatus for producing gyromagnetic resonance of atoms of alkali elements in vapor form located in a unidirectional magnetic field which comprises: a sample of said vapor mixed with a buffer gas so that collisions of said alkali atoms are minimized; means for optically irradiating said atoms with a radiation beam directed substantially parallel to said unidirectional magnetic field and circularly polarized, said optical radiation having a spectral frequency supplying quanta of energy to produce transitions between energy levels to thereby align said atoms in said unidirectional magnetic field in their ground state; means for applying a radio frequency magnetic field to said atoms substantially normal to said unidirectional magnetic field and of the Larmor frequency of said atoms in said magnetic field to thereby produce gyromagnetic resonance transitions of said alkali atoms between Zeeman sublevels in the ground state; and means for detecting said ground state gyromagnetic resonance transitions, including means for measuring the intensity of the optical radiation after passing through said alkali vapor.

3. Magnetic field measuring apparatus comprising an absorption vessel containing an alkali vapor mixed with a buffer gas adapted to be positioned in a unidirectional magnetic field to be measured, means including a light source producing an optical radiation directed through said absorption vessel substantially parallel to said magnetic field and circularly polarized to produce an alignment of said atoms in their ground state in said magnetic field by optical pumping; means for applying a radio frequency magnetic field to the alkali atoms substantially normal to said magnetic field to be measured whereby gyromagnetic resonance transitions of said alkali earth atoms may be produced between Zeeman sublevels in said ground state; and means responsive to the nonabsorbed optical radiation generated by the light source for optically detecting the resonance of said atoms while said radio frequency magnetic field is applied.

4. Magnetic field measuring apparatus as claimed in claim 3 including means for modulating at least one of said unidirectional and radio frequency magnetic fields to thereby sweep through gyromagnetic resonance.

5. Magnetic field measuring apparatus comprising: an absorption vessel containing an alkali vapor mixed with a buffer gas adapted to be positioned in a unidirectional magnetic field to be measured; means including a light source producing an optical radiation directed through said absorption vessel substantially parallel to said magnetic field and circularly polarized to produce an alignement of said atoms in said magnetic field by optical pumping; means for applying a radio frequency magnetic field to the alkali atoms substantially normal to said magnetic field to be measured whereby gyromagnetic resonance transitions of said alkali atoms may be produced; optical radiation detecting means for intercepting said optical radiation after it has passed through said absorption vessel whereby the intensity of said optical radiation may be measured to give an indication of the absorption of the radiation by the alkali atoms, the gyromagnetic resonance being evidenced by a change in said intensity; and means responsive to the frequency of said applied radio frequency magnetic field at resonance for providing an output which varies in accordance with the strength of said magnetic field.

6. Magnetic field measuring apparatus as claimed in claim 5, including means for modulating at least one of said unidirectional and radio frequency magnetic fields to thereby sweep through said gyromagnetic resonance.

7. Apparatus for monitoring the ground state sublevel alignment of alkali atoms in vapor form in a unidirectional magnetic field comprising: means for optically irradiating said atoms with circularly polarized radiation having a substantial propagation direction component parallel to said magnetic field, said optical radiation having a spectral frequency supplying quanta of energy to produce transitions between energy levels for aligning said atoms in the magnetic field; optical detection means for detecting the nonabsorbed optical radiation after it has passed through said atoms; means for applying a radio frequency magnetic field to said atoms substantially perpendicular to the unidirectional magnetic field at a resonance frequency in said unidirectional magnetic field; modulating means for periodically sweeping through the resonance of said alkali atoms; a phase sensitive detector coupled to said optical detection means and to said modulating means providing a reference signal to said phase sensitive detector for comparison with the detected radiation; a frequency tuner coupled to the output circuit of said phase detector for receiving such error signal; and means coupling said frequency tuner to said radio frequency magnetic field applying means to maintain said field applying means stabilized to the resonance frequency.

8. Apparatus for monitoring the ground state sublevel alignment of alkali atoms in vapor form in a unidirectional magnetic field comprising: means for optically irradiating said atoms with circularly polarized radiation having a substantial propagation direction component parallel to said magnetic field, said optical radiation having a spectral frequency supplying quanta of energy to produce transitions between energy levels for aligning said atoms in the magnetic field; optical detection means for detecting the nonabsorbed optical radiation after it has passed through said atoms; means for applying a radio frequency magnetic field to said atoms at the gyromagnetic resonance frequency in said unidirectional magnetic field; modulating means for periodically sweeping through the resonance of said alkali atoms, said modulating means providing a reference signal; a phase sensitive detector coupled to said optical detection means and to said modulating means for developing an error signal; and means coupling said phase sensitive detector to said radio frequency magnetic field applying means to maintain said field applying means stabilized to the resonance frequency.

9. Apparatus for monitoring the ground state sublevel alignment of alkali atoms in vapor form in a unidirectional magnetic field comprising: means for optically irradiating said atoms with circularly polarized radiation having a substantial propagation direction component parallel to said magnetic field, said optical radiation having a spectral frequency supplying quanta of energy to produce transitions between energy levels for aligning said atoms in the magnetic field; optical detection means for detecting the nonabsorbed optical radiation after it has passed through said atoms; means for applying a radio frequency magnetic field to said atoms substantially parallel to the unidirectional magnetic field; modulating means for periodically sweeping through the resonance of said alkali atoms; a phase sensitive detector coupled to said optical detection means and to said modulating means said modulating means providing a reference signal to said phase sensitive detector for comparison with the detected radiation; and means coupling said phase detector to said radio frequency magnetic field applying means to maintain said field applying means stabilized to the resonance frequency.